US008953166B2

(12) United States Patent
Bowlan et al.

(10) Patent No.: US 8,953,166 B2
(45) Date of Patent: Feb. 10, 2015

(54) EXTREME LIGHT PULSE-FRONT TILT AND ITS APPLICATION TO SINGLE SHOT MEASUREMENT OF PICOSECOND TO NANOSECOND LASER PULSES

(75) Inventors: Pamela Bowlan, Atlanta, GA (US); Rick Trebino, Atlanta, GA (US)

(73) Assignee: Wetland Optics, LLC., Atlanta, GA (US)

( * ) Notice: Subject to any disclaimer, the term of this patent is extended or adjusted under 35 U.S.C. 154(b) by 505 days.

(21) Appl. No.: 13/205,766

(22) Filed: Aug. 9, 2011

(65) Prior Publication Data

US 2012/0044490 A1 Feb. 23, 2012

Related U.S. Application Data

(60) Provisional application No. 61/375,561, filed on Aug. 20, 2010.

(51) Int. Cl.
*G01B 9/02* (2006.01)
*G01J 11/00* (2006.01)

(52) U.S. Cl.
CPC ....................................... *G01J 11/00* (2013.01)
USPC ........................................................ 356/454

(58) Field of Classification Search
USPC ........................................................ 356/454
See application file for complete search history.

(56) References Cited

U.S. PATENT DOCUMENTS

| 5,530,544 | A | 6/1996 | Trebino et al. |
| 5,754,292 | A | 5/1998 | Kane et al. |
| 5,936,732 | A | 8/1999 | Smirl et al. |
| 6,008,899 | A | 12/1999 | Trebino et al. |
| 6,204,926 | B1 * | 3/2001 | Maznev et al. ............... 356/521 |
| 6,504,612 | B2 | 1/2003 | Trebino |
| 6,900,940 | B2 * | 5/2005 | Mitamura et al. ............ 359/580 |
| 7,304,798 | B2 * | 12/2007 | Izumi et al. .................... 359/577 |
| 7,474,467 | B2 | 1/2009 | Trebino |
| 7,817,282 | B2 | 10/2010 | Bowlan et al. |
| 7,817,283 | B2 | 10/2010 | Gabolde et al. |
| 2003/0128917 | A1 * | 7/2003 | Turpin et al. .................... 385/24 |
| 2012/0253721 | A1 | 10/2012 | Cohen et al. |

OTHER PUBLICATIONS

STIC search included.*
Akturk et al., "Extremely simple single-prism ultrashort-pulse compressor," Opt. Expr., 14(21), 10101 (Oct. 2006).

(Continued)

*Primary Examiner* — Hwa Lee
*Assistant Examiner* — Jonathan Cook
(74) *Attorney, Agent, or Firm* — Thomas | Horstemeyer, LLP.

(57) ABSTRACT

Various methods and systems are provided for generation of a laser pulse with massive pulse-front tilt (PFT) and its use for measurement of laser pulses. In one embodiment, a method includes directing a laser pulse into an etalon and propagating the laser pulse through the etalon to form a tilted pulse. Another embodiment involves directing pulses into an etalon and propagating the pulses through the etalon in opposite directions to form a pair of massively tilted pulses that are tilted in opposite directions. In another embodiment, a system includes a Fresnel biprism configured to produce a pair of pulses from an input pulse and a lens configured to direct each pulse through an opening (or openings) in an input surface of an etalon, where the etalon is configured yield a pair of pulses tilted in opposite directions, each pulse having a massive PFT.

30 Claims, 9 Drawing Sheets

(56) References Cited

OTHER PUBLICATIONS

Akturk et al., "The general theory of first-order spatio-temporal distortions of Gaussian pulses and beams," Optics Express 13, 8642-8661 (Oct. 2005).

Akturk et al., "Measuring pulse-front tilt in ultrashort pulses using grenouille," Opt. Expr., 11(5), 491 (Mar. 2003).

Akturk et al., "Measuring spatial chirp in ultrashort pulses using single-shot frequency-resolved optical gating," Opt. Expr., 11(1), 68 (Jan. 2003).

Bowlan et al., "Crossed-beam spectral interferometry: A simple, high-spectral-resolution method for completely characterizing complex ultrashort pulses in real time," Opt. Expr., 14(24), 11892 (Nov. 2006).

Bowlan et al., "Directly measuring the spatio-temporal electric field of focusing ultrashort pulses," Opt. Expr., 15, 10219 (Aug. 2007).

Bowlan et al., "Extreme pulse-front tilt from an etalon," Journal of the Optical society of America B vol. 27 No. 11 pp. 2322-2327 (Nov. 2010).

Bowlan et al., "Measuring the spatiotemporal electric field of tightly focused ultrashort pulses with sub-micron spatial resolution," Optics Express, 16(18), 13663 (Aug. 2008).

Bowlan et al., "Measuring the spatiotemporal field of ultrashort bessel-x pulses," Opt. Lett., 34(15), 2276 (Aug. 2009).

Bowlan et al., "Ultrafast-pulse measurement: Wanted: Simple methods for complex measurements," Laser Focus World, (Jun. 2007).

Cohen et al., "Measuring temporally complex ultrashort pulses using multiple-delay crossed-beam spectral interferometry," Optics Express 18, 6583-6597 (Mar. 2010).

Cohen et al., "Highly simplified device for measuring the intensity and phase of picosecond pulses," Optics Express, vol. 18, No. 16 (Jul. 2010).

Lõhmus et al., "Directly recording diffraction phenomena in the time domain," Lith J. Phys., (Apr. 2010).

O'Shea et al., "Highly simplified device for ultrashort-pulse measurement," Optics Letters 26, 932-934 (Jun. 2001).

Trebino et al., "Measuring everything you've ever wanted to know about an ultrashort light pulse," European Virtual University (www.mitr.p.lodz.pl/evu), (Dec. 2008).

Trebino et al., "Simple devices for measuring complex ultrashort pulses," Laser & Photon. Rev., 3(3), 314 (Dec. 2008).

Xiao et al., "A dispersion law for virtually imaged phased-array spectral dispersers based on paraxial wave theory," IEEE Journal of Quantum Electronics 40, 420-426 (Apr. 2004).

Taft et al., "Ultrashort optical waveform measurements using frequency-resolved optical gating," Optics Letters, vol. 20, No. 7/ (Apr. 1995).

Akturk et al., "Spatio-temporal couplings in ultrashort laser pulses," Journal of Optics, vol. 12, (Aug. 2010).

A.G. Kostenbauder, "Ray-pulse matrices: a rational treatment for dispersive optical systems," IEEE Journal of Quantum Electronics, vol. 26, No. 6, pp. 1148-1157 (Jun. 1990).

Vega et al., "Generalized grating equation for virtually imaged phased-array spectral dispersers," Applied Optics, vol. 42, No. 20, pp. 4152-4155 (Jul. 2003).

D.J. Gauthier, "Comment on 'Generalized grating equation for virtually imaged phased-array spectral dispersers'," Applied Optics, vol. 51, No. 34, pp. 8184-8186 (Nov. 2012).

* cited by examiner

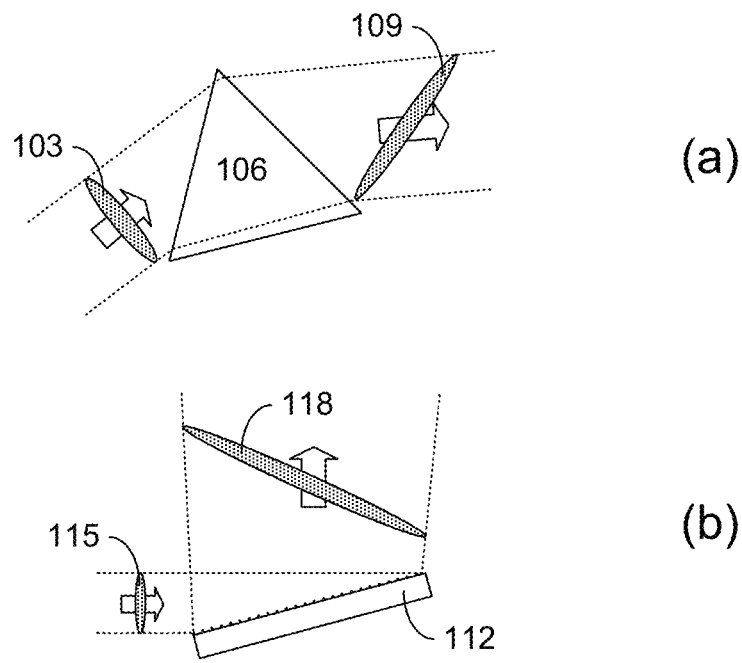
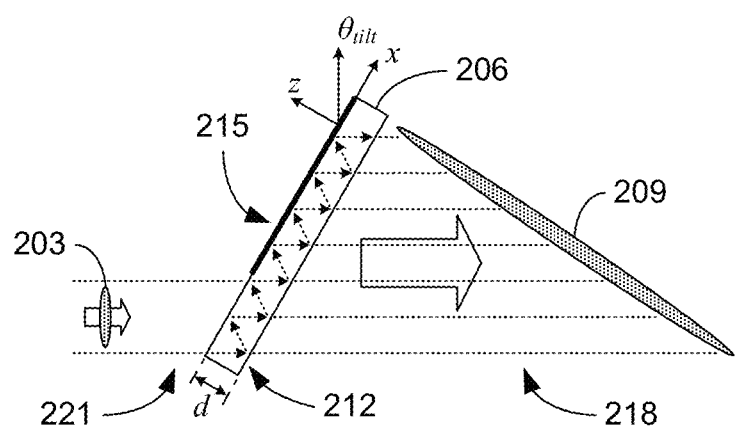
FIG. 2

EXTREME LIGHT PULSE-FRONT TILT AND ITS APPLICATION TO SINGLE SHOT MEASUREMENT OF PICOSECOND TO NANOSECOND LASER PULSES

CROSS REFERENCE TO RELATED APPLICATIONS

This application claims priority to U.S. provisional application entitled "EXTREME PULSE-FRONT TILT FROM AN ETALON AND COMPLETE MEASUREMENT OF NANOSECOND LASER PULSES IN TIME" having Ser. No. 61/375,561, filed Aug. 20, 2010, the entirety of which is hereby incorporated by reference.

STATEMENT REGARDING FEDERALLY SPONSORED RESEARCH OR DEVELOPMENT

This invention was made with government support under agreement FA8650-09-C-7933 awarded by the Defense Advanced Research Projects Agency. The Government has certain rights in the invention.

BACKGROUND

The manipulation of laser pulses is an important aspect of many optical devices. For example, devices that introduce angular dispersion into a beam or pulse have many applications. A different, but potentially useful, phenomenon is pulse-front tilt. Small amounts of pulse-front tilt may be introduced by prisms and gratings, but a method for introducing massive pulse-front tilt—as much as 89.9° or more—has remained unknown.

For most applications, laser pulses must avoid variations in their intensity and phase (color) within a pulse and from pulse to pulse. Variations in beam intensity and phase in time reduce the usability of the generated pulses. Accurate measurement of the laser pulses can ensure the operation of the laser and the quality of the application. Techniques exist for measuring slowly varying (microsecond and longer) pulses. Also, techniques exist for measuring much shorter, femtosecond and few-picosecond pulses. But practical single-shot techniques do not exist for measuring many-picosecond to nanosecond pulses.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 shows graphical representations of examples of optical elements that introduce pulse-front tilt.

FIG. 2 is a graphical representation of an example of an optical device that introduces pulse-front tilt in a pulse in accordance with various embodiments of the present disclosure.

DETAILED DESCRIPTION

Figure 3:
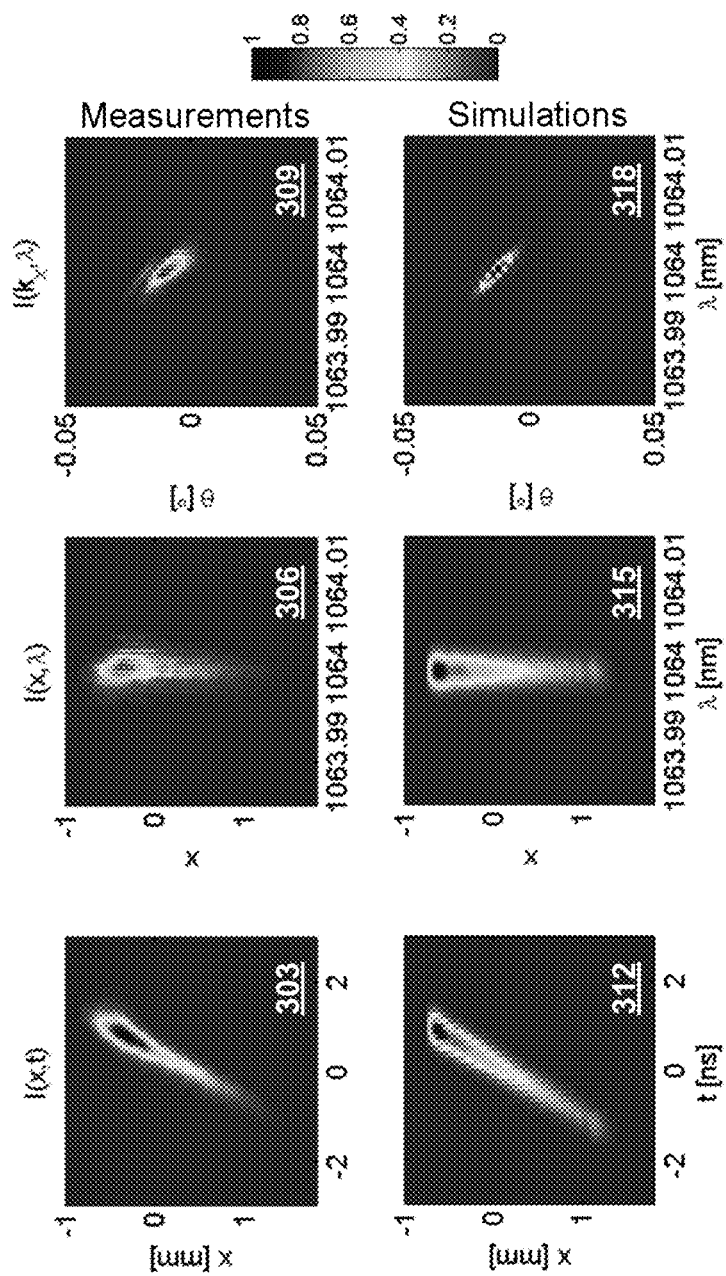
FIG. 3 illustrates examples of experimental and simulation results of pulse-front tilt in a pulse using the optical device of FIG. 2 in accordance with various embodiments of the present disclosure.

Disclosed herein are various embodiments of methods and systems related to the manipulation and measurement of laser pulses. Reference will now be made in detail to the description of the embodiments as illustrated in the drawings, wherein like reference numbers indicate like parts throughout the several views.

Pulse-front tilt is an interesting phenomenon in which one edge of a pulse propagates ahead of or behind its other edge, with intermediate regions in between. In other words, the pulse is sloped or tilted as it propagates.

Prisms introduce some pulse-front tilt because the group (intensity) velocity in glass is slower than the phase velocity, so the part of the pulse that propagates through the base of the prism takes longer to propagate through the prism. While the phase front of the beam emerging from the prism is fundamentally perpendicular to the direction of propagation, the pulse front (the line of the peak intensity across the pulse) is tilted. Diffraction gratings introduce somewhat more pulse-front tilt (up to about 45°) than prisms and do so because the part of the beam that impinges on the front edge of the grating emerges sooner than the part that impinges on the back edge.

An etalon can, however, introduce massive amounts of pulse-front tilt. In an etalon, some of the pulse passes straight through and emerges first. As the remainder of the beam undergoes multiple reflections inside the etalon, regions of the beam that undergo the most internal reflections are displaced the most. In this manner, pulse-front tilts in excess of 60° can be generated, and tilts in excess of 89° are possible. Such tilts are achievable independent of the precise geometry of the etalon and depend mainly on the angular dispersion introduced by the etalon. In addition, an interferometer of any sort (of which an etalon is a special case) also introduces massive pulse-front tilt for the same reason.

A more quantitative understanding of this effect is provided as follows. Because the electric field $E(x,t)$ of the pulse can be represented equivalently in any Fourier domain, xt, x$\omega$, $k_x\omega$, or $k_x t$, a given spatiotemporal coupling actually manifests itself as several seemingly different, but in fact equivalent, effects when viewed in any of the other domain. Indeed, a common spatiotemporal coupling is angular dispersion, which is a cross term in the intensity (real) of the field, $E(k_x,\omega)$, $$\tilde{\tilde{E}}(k_x,\omega)=\tilde{\tilde{E}}_0[k_x+\gamma(\omega-\omega_0),\omega] \qquad \text{EQN. (1)}$$

where $\gamma$ is the coupling constant (proportional to the angular dispersion) and $\omega_0$ is the pulse center frequency, the tilde means Fourier transformation from the time domain, t, to the frequency domain, $\omega$, and the hat (^) indicates Fourier transformation from x to $k_x$. By Fourier transforming to the xt domain (and applying the shift and then inverse shift theorems), it can be seen that, if angular dispersion is present, there is always a corresponding xt coupling in the intensity, called pulse-front tilt (PFT):

$$E(x,t) \propto E_0(x,t+\gamma x) \qquad \text{EQN. (2)}$$

Note that this expression yields a pulse field whose peak in time, t, depends on position, x. The PFT is directly proportional to γ. In other words, the pulse-front tilt is proportional to the angular dispersion in the beam, and any component that introduces angular dispersion also introduces pulse-front tilt.

Because diffraction gratings generally introduce more angular dispersion than prisms, they also yield a more tilted pulse front. Referring to FIG. 1, shown are examples of pulse-front tilt from diffraction gratings and prisms. As illustrated in FIG. 1(a), an input pulse 103 entering a prism 106 results in a tilted pulse 109 because the group velocity (the velocity of the pulse intensity) exceeds the phase velocity. Whereas the pulse phase fronts (the planes of constant phase) are necessarily perpendicular to the direction of propagation, the delay seen by the pulse intensity thus varies from the base to the tip of the prism 106. Larger tilts may be achieved with a diffraction grating 112 as illustrated in FIG. 1(b), where a simple light-travel-time argument shows that the diffracted pulse is tilted. Diffracting an input pulse 115 off a diffraction grating 112 can produce tilted pulses 118 with larger tilted pulse fronts than prisms can. And because the angular dispersion introduced by an etalon can be orders of magnitude more than that of prisms 106 and gratings 112, the pulse-front tilt introduced by etalons can be extremely large.

With reference to FIG. 2, shown is a graphical representation illustrating an input pulse 203 passing through an etalon 206 to produce the PFT of the output pulse 209. An etalon 206 is simply two parallel, highly reflecting surfaces 212 and 215, in which the output beam 218 is the superposition of many delayed replicas of the input beam 221. The delay between each replica is 2nd/c, where 2d is the etalon round-trip length, and n is the refractive index of the medium inside the etalon 206. Due to the interference of the many output beams 218, only colors having a wavelength that is an integer (m) multiple of the etalon's width, or $m\lambda_0/n=2d$, exit the cavity without loss. Therefore, when focusing into an etalon 206, a range of path lengths is present, one for each ray, so different colors will exit the cavity along different rays, or angles, resulting in its angular dispersion. It should also be noted that, like gratings, which have multiple orders (output beams), etalons also have multiple orders. In order to effectively use the output from such components, whether the angular dispersion or PFT is desired, only one order is generally required, and undesired order components should be filtered out. This may be accomplished using an iris, aperture, or other component that allows only one such order to pass while removing the others.

For a given beam size, etalons 206 can be used to generate approximately 100 times more angular dispersion than gratings and thousands of times more than prisms as indicated by the above Fourier-transform result. Indeed, this can be seen based upon light-travel-time considerations illustrated in FIG. 2: the part of the pulse that makes the most passes through the etalon 206 sees the most delay. And the thicker, more reflective, and larger the etalon 206, the more the angular dispersion and pulse-front tilt. However, significant pulse-front tilt is achieved independent of the precise geometry of the etalon; all that is required is the generation of significant angular dispersion.

The pulse-front tilt may be estimated by considering that each delayed replica is also spatially shifted along the x direction due to the etalon's tilt angle $\theta_{tilt}$ (see FIG. 2). So the left side of the beam is expected to be ahead in time compared to the right side by approximately $2dn/(c \cos \theta_{tilt})$ multiplied by the number of bounces of the beam inside of the etalon 206. Considering that the number of bounces is approximately given by the finesse, $\mathscr{F}$, a typical value for which can be about 50, for d=5 mm, n=1.5, and with $\theta_{tilt}=1°$, 2.5 ns of pulse-front tilt is expected across an output beam 218 with a width along the x dimension of about 5.8 mm. As can be seen by the approximation, the pulse-front tilt may be adjusted by varying the etalon's tilt angle $\theta_{tilt}$ and/or by varying the distance d between the reflecting surfaces 212 and 215 of the etalon 206. In some implementations, the tilt angle $\theta_{tilt}$ and the distance d may be set to provide a preset pulse-front tilt. In other implementations, the tilt angle $\theta_{tilt}$ and/or the distance d between the reflecting surfaces 212 and 215 may be adjustable to allow for tuning of the pulse-front tilt.

To more precisely calculate the field emerging from the etalon 206, for a given input pulse 203, the emerging delayed, diverging, transversely displaced replicas are superimposed. Beginning with the field just after a focusing lens $E_{in}(x,\lambda)$, which is given by:

$$E_{in}(x, \omega, z = 0) = \exp\left(-\left(\frac{\omega-\omega_0}{\Delta\omega}\right)^2 - \left(\frac{x}{w_0}\right)^2 - ikx\sin\theta_{tilt} + i\frac{k_0 x^2}{2f}\right)$$

EQN. (3)

where $\theta_{tilt}$ is the incident angle of the center ray at the etalon, $w_0$, is the input beam spot size, and $\Delta\omega$ is the spectral bandwidth. The field immediately after the etalon 206 is given by:

$$E_{out}(x, \omega) = t_1 t_2 \sum_{m=0}^{F} (r_1 r_2)^m E_f(x, \omega, 2dm)$$

EQN. (4)

where $t_1$, $r_1$, $t_2$ and $r_2$ are the reflection and transmission coefficients of the first and second surfaces 212 and 215 of the etalon, and $E_f = E_{in}(x,\omega,z+f)$, that is, the field at the focus. To calculate the spatio-spectral field after each pass through the etalon 206, the angular-spectrum-of-plane-waves approach is used, to propagate the field from the previous pass by an additional distance of 2d, as shown below:

$$E_f(x,\omega,2dm) = \mathfrak{S}_x^{-1}\{\mathfrak{S}_x\{E_f(x,\omega,2d(m-1))\}\exp(i2dnk_0\sqrt{1-(k_x/\lambda)^2})\}.$$

EQN. (5)

This involves a one-dimensional Fourier transform of the initial field to the $k_x$-domain, multiplying this field by the propagation kernel as a function of $k_x$, and then inverse-Fourier transforming back the x-domain. The same approach is used to propagate the initial field $E_{in}(x,\omega)$ up to the etalon's front surface to generate $E_f(x,\omega)$.

Crossed-beam spectral interferometry was used to measure the spatiotemporal intensity and phase added to an input pulse 203 by an etalon 206 (referred to as the PFT etalon) such as the example of FIG. 2. The back surface 215 of the PFT etalon 206 was imaged onto a camera in the x, or angular dispersion dimension of the PFT etalon 206, and in the other dimension, the beam was spectrally resolved with an etalon spectrometer to achieve the needed spectral resolution. A spatially clean reference pulse crossed at a small angle with the tilted unknown pulse 209 to produce the following interferogram at the camera:

$$I(x,\lambda) = |E_{ref}(\lambda)|^2 + |E_{unk}(x,\lambda)|^2 + |E_{unk}(x,\lambda)E_{ref}(\lambda)|\cos(kx\theta_c + \phi_{unk}(x,\lambda) - \phi_{ref}(\lambda))$$

EQN. (6)

where $\theta_c$ is the crossing angle between the beams. The spatial information of the unknown pulse was simultaneously measured and a Fourier-filtering procedure was used to extract the spatio-spectral intensity and phase of the unknown pulse from the measured interferogram. The spatio-spectral field $E(x,\lambda)$ of the pulse was measured just after the etalon 206. The unknown pulse was retrieved using the Fourier filtering algorithm. The retrieved field was Fourier transformed to both the $k_x x$ and xt domains to see both the angular dispersion and the pulse-front tilt.

Referring to FIG. 3, shown are the experimentally retrieved intensities in these three domains (intensity versus x and t 303, intensity versus $\lambda$ and x 306, and intensity versus $\theta$ and $\lambda$ 309 where $k_x = k_0 \sin \theta \approx 2\pi/\lambda \sin \theta$). FIG. 3 also shows corresponding simulation results (intensity versus x and t 312, intensity versus $\lambda$ and x 315, and intensity versus $\theta$ and $\lambda$ 318) using all of the experimental parameters below the experimental data.

As expected, the intensity $I(k_x, \lambda)$ 309, which indicates the angular dispersion, shows a tilt, indicating that different colors are propagating at different angles (where $k_x = 2\pi/\lambda_0 \sin \theta$) due to the angular dispersion introduced by the PFT etalon 206. By finding the maximum in the spectrum for each angle, the tilt was found to be linear and to have a slope of 3°/nm. A diffraction grating with 1000 grooves/mm, used at grazing incidence and for a wavelength 1064 nm results in an angular dispersion of 0.06°/nm, or about 1/50 that of the PFT etalon 206. The pulse's couplings were also characterized with dimensionless $\rho$-parameters, which are the normalized cross moments of the pulse's two-dimensional intensity, whose magnitudes are always ≤1. For the angular dispersion, $\rho_{k\lambda} = 0.015$ for the pulse from the PFT etalon 206, which was quite small, due to the small bandwidth of the laser.

The presence of pulse-front tilt is apparent from the large tilt in the intensity $I(x,t)$ 303 in FIG. 3. Again, using curve fitting, the tilt was found to be linear and have a slope 1.3 ns/mm, or $\rho_{xt} = 0.27$, which is a large value for this parameter. The pulse 209 out of the PFT etalon 206 is extremely tilted with its arrival time varying by 2.6 ns, or 78 cm, across the about 2 mm beam at the camera, that is, a tilt angle of 89.9°. Four times demagnification was used in the spatial filter and also in the simulations, so just after the etalon 206, the tilt would have been 325 ps/mm.

The spatio-spectrum $I(x,\lambda)$ 306 shows no detectable tilt, and therefore no spatial chirp. The $\rho$ parameter for this spectrum was $\rho_{xt} = 0.006$, which is generally considered to be out of the detectable range, or just due to noise in the data. In the $x\lambda$-domain, the coupling introduced by the etalon is wave-front-tilt dispersion, which is a phase coupling, which is why the spatiospectral intensity in FIG. 3 is not tilted. A single Fourier transform moves a purely imaginary quantity into the intensity, which is why the coupling is apparent in the $k_x x$, and xt intensities 309 and 306 in FIG. 3.

Short light pulses are usually measured by generating an autocorrelation or a variation on it. An autocorrelation involves varying the delay between two replicas of the pulse and measuring the nonlinear-optical signal-pulse energy from a nonlinear crystal in which the beams cross. Autocorrelation, however, only yields a rough measure of the pulse length and yields no information about the pulse phase. Frequency-resolved optical gating (FROG) utilizes a spectrally resolved autocorrelation coupled with a pulse-retrieval algorithm for retrieving the complete characteristics of a pulse. FROG can measure the complete pulse shape and also the phase vs. time for arbitrary femtosecond (fs) pulses without the need for assumptions about the pulse shape or phase.

However, pulses that are many picoseconds (ps) to nanoseconds (ns) long, from Q-switched solid-state lasers, pulsed diode lasers, and fiber lasers and amplifiers, remain largely immeasurable, and are usually complex in time, often varying wildly from pulse to pulse. Electronic devices such as streak cameras and fast photo-detectors coupled to a very fast oscilloscope can measure the pulse intensity vs. time, but they are very expensive, and measuring the phase remains a challenge. Extending femtosecond techniques to this temporal range is also difficult. The necessary delay range must exceed the pulse length by a factor of about 3, which is a challenge when measuring pulses longer than about 100 picoseconds (ps). For a one nanosecond (ns) pulse, the necessary delay is about 3 nanoseconds or about 1 meter of path length given the speed of light. The generation of such large delays is difficult. A large-range translation stage can do so, but can only achieve one delay at a time and so measurements using it are necessarily multishot, which is undesirable, especially when pulse-to-pulse instability is present. A method for generating such a large range of delays simultaneously on one laser shot is desirable.

This can be accomplished using massive pulse-front tilt. If two pulses with opposite pulse-front tilt are crossed the delay between them varies transversely across their beams. Crossing pulses with massive pulse-front tilt allows for much greater delays to be achieved. The beams overlap in a nonlinear crystal that is imaged onto a camera, which records the trace vs. the transverse spatial coordinate, which serves as the delay axis and which can easily be calibrated using, for example, a double pulse with known separation.

Figure 4:
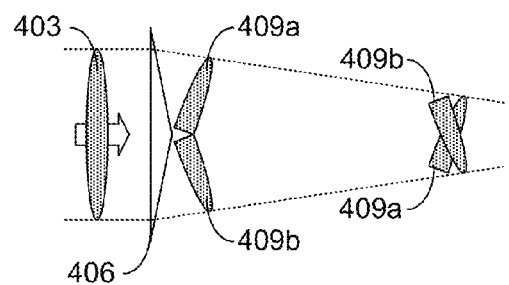
FIGS. 4-6 are graphical representations of examples of systems for single shot measurement using crossed beams to generate a range of delays between two pulses in accordance with various embodiments of the present disclosure.

Referring now to FIGS. 4-9, shown are graphical representations of systems for single shot measurements of many-picosecond (ps) and nanosecond (ns) laser pulses. As illustrated in FIG. 4, a beam of input pulses 403 passes through a Fresnel biprism 406, where it is split into two beams 409 of tilted pulses at different angles. Other combinations of optical components may also be used to provide the two beams 409 of tilted pulses. As illustrated in FIG. 4, the Fresnel biprism 406 generates two pulses 409a and 409b that are tilted in opposite directions from a single input pulse 403 without the need for a beam splitter and beam recombining optics and that propagate along a crossing path.

Figure 5:
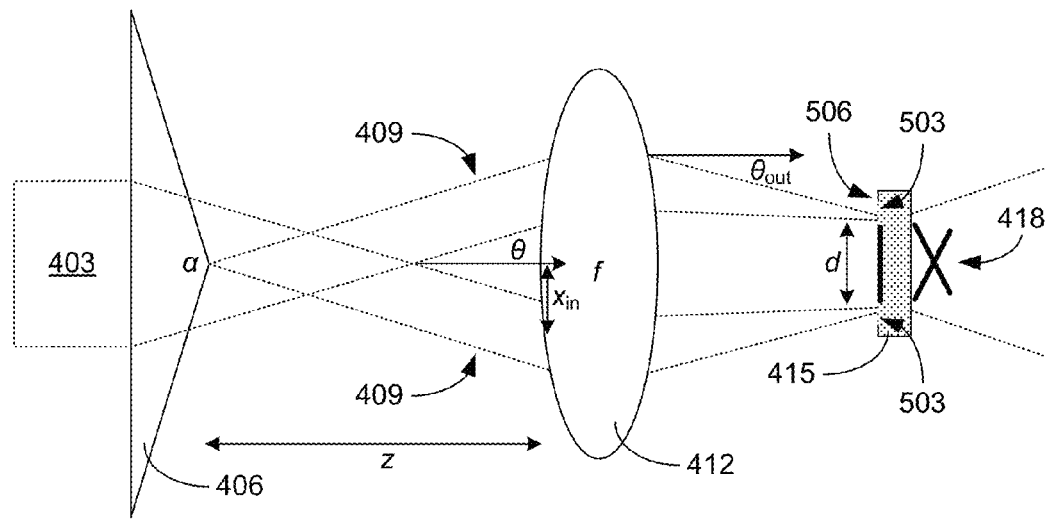

Referring next to FIG. 5, the two beams 409 cross before reaching a cylindrical lens 412 that focuses the beams 409 into openings (uncoated entry slits or transparent regions) on opposite sides of a pulse front tilt (PFT) etalon 415. The placement of the Fresnel biprism 406, the cylindrical lens 412, and the PFT etalon 415 is illustrated in FIG. 5. The cylindrical lens 412 may be translated to tune the incident angle $\theta_{out}$ of the two beams 409 into the PFT etalon 415. To vary the spacing d between the two beams 409 at the PFT etalon 415, the focal length f or biprism angle $\alpha$ may be changed. The relationship may be described by $d = 2\theta f$ and $\theta_{out} = f + \theta$. There are three constrained parameter (d, $\theta_{out}$, and f) and two free parameters ($\theta$ and $x_{in}$, which varies with z). For example, if f=115 mm, $\alpha=160°$, and $\theta=4.98°$, then positioning the cylindrical lens 412 at z=about 95 mm results in $x_{in}$=about 8.4 mm, $\theta_{out}$=about 1°, and d=about 20 mm. Small variations in the position z may be made to tune the system.

In the embodiment of FIG. 5, the PFT etalon 415 includes two transparent openings 503 on opposite sides of an input surface 506 of the PFT etalon 415. Focusing the two beams 409 on opposite openings yields two output pulses 418 with massive PFTs in opposite directions from the opposite surface of the PFT etalon 415. Using an etalon can result in a tilt of the emerging pulses 418 of about 89.9°. A so-called virtually imaged phased array (VIPA) etalon does so equivalently, but with higher efficiency. As a result, one side of a beam about 1 cm wide can precede the other side by over a meter, corresponding to several ns of delay.

Figure 6:
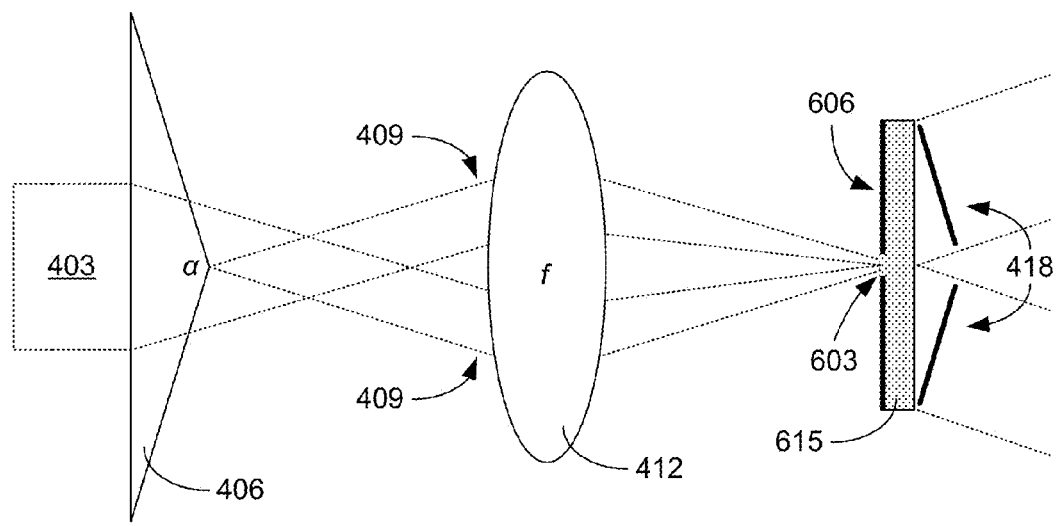

Referring now to FIG. 6, an etalon 615 with a single transparent opening 603 located in the center of the input surface 606 of the etalon 615 may be used in other embodiments to yield the two emerging pulses 418. As in FIG. 5, the beam of input pulses 403 passes through the Fresnel biprism 406, where it is split into two beams 409 of pulses that are tilted in opposite directions. The cylindrical lens 412 that focuses the beams 409 into an opening 603 (uncoated entry slit or transparent region) in the middle of an input surface 606 of an etalon 615. The tilted pulses propagate through the etalon 615 in opposite directions to yield the two output pulses 418 with massive PFTs in opposite directions.

Figure 7:
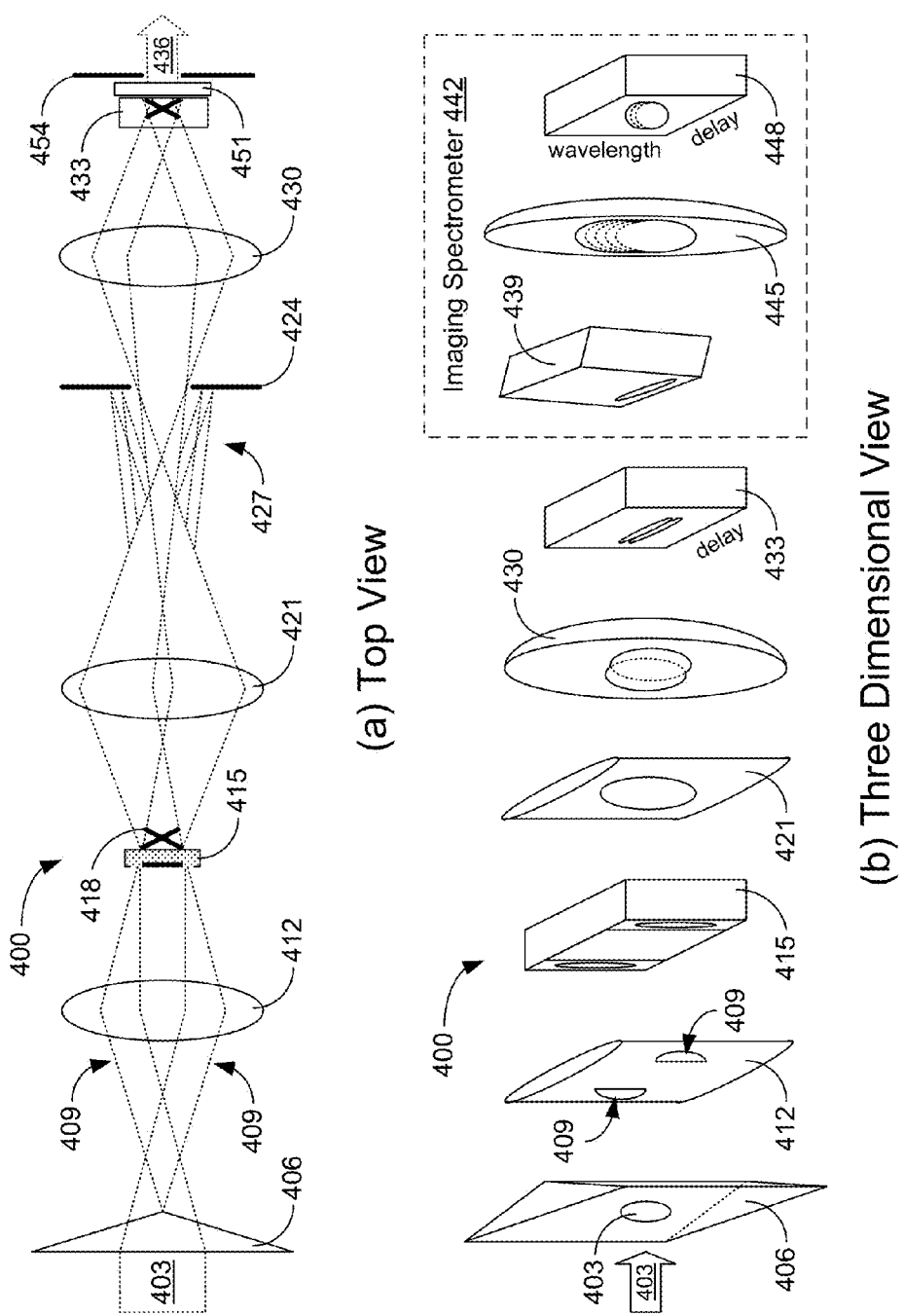
FIGS. 7-9 are graphical representations of examples of systems for single shot measurements of many-picosecond and nanosecond laser pulses in accordance with various embodiments of the present disclosure.

With reference to FIG. 7, shown is a system 400 that uses the PFT etalon 415 of FIG. 5 (or the PFT etalon 615 of FIG. 6) to yield a massive pulse front tilt (PFT) to provide sufficient delay of the pulses for measurement. A pulse front tilt of 60° or more is considered a massive tilt. As illustrated in FIG. 7, a beam of input pulses 403 passes through a Fresnel biprism 406, where it is split into two beams 409 of tilted pulses at different angles. The two beams 409 cross before reaching a cylindrical lens 412 that focuses the beams 409 into openings on opposite sides of a pulse front tilt (PFT) etalon 415. With reference back to FIG. 2, shown is a graphical representation illustrating an input pulse 203 passing through an etalon 206 to produce the PFT of the output pulse 209. Multiple reflections inside the etalon 206 results in a significant delay of the upper side of the beam with respect to the lower side of the beam, where it passes directly through the etalon 206. To generate a continuously tilted pulse front, or a simple linear angular dispersion, the input beam 221 is focused into one side of an input surface 215 of the etalon 206 and the output beam 218 emerges from the opposite surface 212 of the etalon 206. In the absence of spatial chirp, PFT is proportional to the angular dispersion.

Because etalons 206 have up to 100 times the angular dispersion of a diffraction grating 112 (FIG. 1), their output pulse 209 will also have 100 times more tilt, that is, nanoseconds. This can be seen by simple light-travel-time considerations: the region of the output beam that makes the most round trips through the etalon 206 sees the most delay. And the thicker and more reflective the etalon 206, the more the dispersion and tilt. The larger the PFT, the greater the pulse delay. The resulting PFT may be, e.g., greater than 60° and even approach 90°, i.e. about 89.9°. For example, the resulting PFT may be greater than 75°, greater than 80°, greater than 85°, greater than 89°, and/or about 89.9°. Pulse-front tilts of about 89.9° have been confirmed.

With reference back to FIG. 7, etalons have many orders, and only one is needed. The emerging pulses 418 may be focused by another lens 421 (e.g., a cylindrical lens) and passed through an aperture 424 to spatially filter out higher orders 427 from the emerging beams. The additional orders are removed by the aperture 424. An emerging pulse 418 can be used in any plane, but if used in an image plane after the etalon 415, it will also maintain its temporal intensity and phase.

In the embodiment of FIG. 7, an anamorphic lens 430 directs the beams along a pair of crossing trajectories to overlap the beams at a SHG crystal 433. The anamorphic lens 430 images the PFT etalon 415 onto the SHG crystal 433 horizontally and focuses into the SHG crystal 433 vertically. Thus, two spatially overlapping and oppositely tilted pulses (each spanning several ns) impinge on and propagate through the SHG crystal 433 along crossing trajectories, yielding a single-shot autocorrelation of the second harmonic (SH) beam 436.

The SH beam 436 is spectrally resolved along the vertical dimension by a spectrometer etalon 439 (e.g., a VIPA etalon) in an imaging spectrometer 442. The autocorrelated SH beam 436 out of the SHG crystal 433 is focused into the etalon 442, which spectrally resolves the SH beam 436 along the vertical dimension to form a two-dimensional trace. In some embodiments, the SHG crystal 433 and the spectrometer etalon 439 may be combined as an "SHG etalon." For example, the SHG crystal 433 could be made with highly parallel sides. Its front surface could then be coated to be highly reflective at the SH wavelength. And its back surface could be coated to reflect the SH with about 97% (as is standard for high-resolution etalons). This would allow the SHG crystal 433 to spectrally resolve the SH with the much higher spectral resolution. This would yield an even more compact and simplified system.

An anamorphic lens 445, which is located at its vertical focal length from an image capture device 448 (e.g., a camera), maps angle (wavelength), or color, onto the vertical dimension of the image capture device 448 and images the autocorrelation of the SHG crystal 433 onto the horizontal dimension of the camera, resulting in a single-shot FROG trace that may be captured by the image capture device 448. A blue filter 451 and slit 454 may be included to further filter the autocorrelation of the SHG crystal 433 and provide a green SH beam 436 to the spectrometer etalon 439. In some embodiments, an anamorphic lens may be replaced with two cylindrical lenses or a cylindrical lens plus a spherical lens or other focusing or imaging elements.

Figure 8:
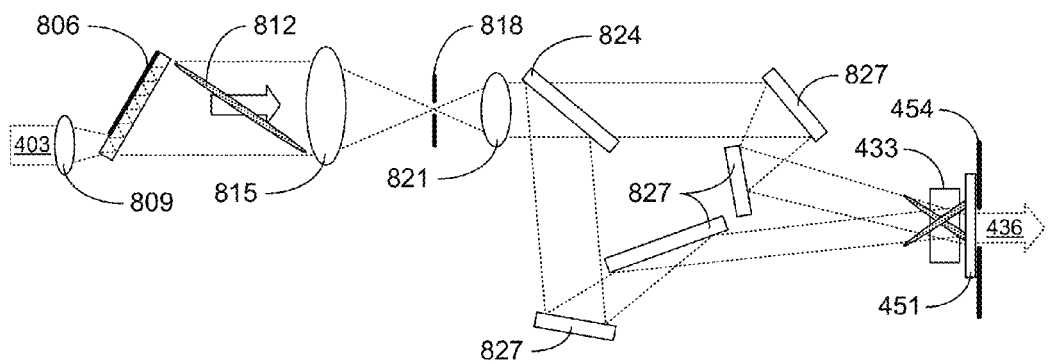

Referring now to FIG. 8, shown is a graphical representation of an alternative system 800 for single shot measurements of nanosecond (ns) laser pulses. A beam of input pulses 403 is directed into a PFT etalon 806 through a lens 809 to yield a pulse 812 with a massive PFT. The emerging pulse 812 may then be focused by lens 815 and passed through slit 818 to spatially filter the beam. Lens 821 focuses the beam on beam splitter 824 that splits the beam into two beams of pulses that are tilted in opposite directions. Mirrors 827 direct the beams along a pair of crossing trajectories to overlap the beams at a SHG crystal 433. A blue filter 451 and slit 454 may be included to further filter the autocorrelation of the SHG crystal 433 and provide a green SH beam 436 to the spectrometer etalon 439 (FIG. 4).

The image capture device 448 captures the single shot FROG trace to extract the measured pulse characteristics. A pulse retrieval application may be used to extract the characteristics from the measured information. The pulse retrieval application may be based upon a FROG retrieval algorithm such as presented in, e.g., R. Trebino, "Frequency-Resolved Optical Gating: The Measurement of Ultrashort Laser Pulses" (Kluwer Academic Publishers, 2000).

Figure 9:
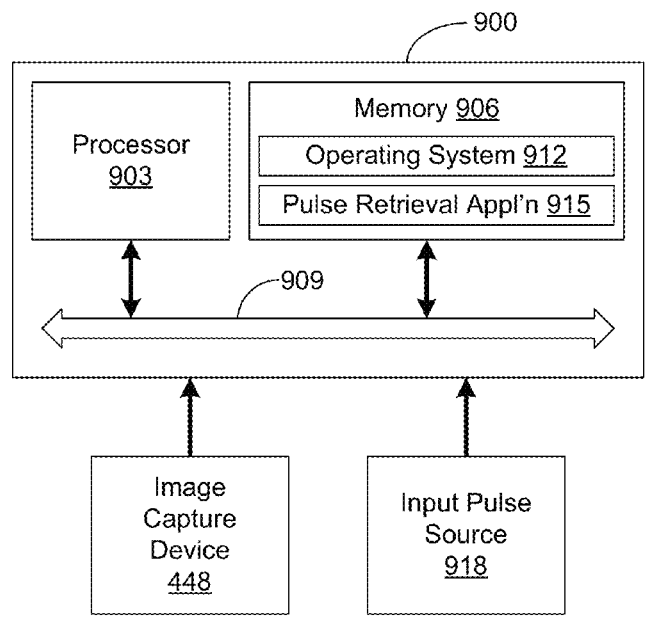

Turning to FIG. 9, shown is a block diagram of a computer system 900 that is attached to the image capture device 448 according to an embodiment of the present invention. Such a computer system 900 may be embodied in the form of, e.g., a desktop computer, a laptop computer, tablet computer systems, or other devices with like capability. The computer system 900 may include various input devices such as a keyboard, microphone, mouse, or other device as can be appreciated. The computer system 900 includes a processor circuit having a processor 903 and a memory 906, both of which are coupled to a local interface 909. The local interface 909 may be, for example, a data bus with a control/address bus as can be appreciated.

Stored on the memory 906 and executable by the processor 903 are an operating system 912 and a pulse retrieval application 915. The pulse retrieval application 915 is executed in order to retrieve pulse information from the FROG trace captured by the image capture device 448. In addition, the pulse retrieval application 915 may control triggering the source 918 of the input pulse 403 (FIG. 4) such as, e.g., a laser and/or the capture of the FROG trace by the image capture device 448. The pulse retrieval application 915 may comprise, for example, one or more applications executed to perform various functionality. Such applications may comprise, for example, Matlab, LabView or any compiled code.

Experimental Results

The single shot measurement system 400 of FIG. 4 was tested using, as the input pulse source 918 (FIG. 9) both a 1064 nm microdisk seed laser emitting slightly sub-nanosecond pulses and also pulses from the microdisk seed laser amplified by a single-stage Yb-fiber amplifier pumped with a 976 nm diode laser. Unlike most ns lasers, the input pulse source 918 is relatively stable from pulse to pulse, facilitating its development. On the other hand, it provided a different challenge in that its pulse energy was significantly less than, say, a typical Q-switched laser.

The seed laser for a master oscillator fiber amplifier (MOFA) was a diode-pumped Nd:LSB microdisk laser from Standa. It emitted slightly sub-nanosecond pulses with about 8 µJ of energy and a 10 kHz repetition rate. These pulses were amplified with a one-stage fiber amplifier. The fiber was a 2 m-long double-clad Yb-doped polarization-maintaining fiber with an inner-core diameter of 25 µm, and an outer-core diameter of 250 µm from Nufern. The fiber was coiled to achieve single-mode operation. As the pump for the Yb-fiber amplifier, a diode laser from Apollo Instruments was used, whose wavelength was centered at 976 nm and had about 3 nm of bandwidth. Both the pump and seed lasers were free-space-coupled into the Yb-fiber. The pump and seed lasers were coupled into opposite ends of the fiber to reduce the nonlinearities. The pulses shown in FIGS. 11A and 11B were amplified by 12× and 15×, resulting in an average power of 170 mW and 213 mW, respectively, for the amplified seed laser. This required 2 and 2.8 Watts of pump power, respectively, not accounting for coupling losses and loss at the dichroic mirror.

A two-gap PFT etalon 415 (FIG. 4) was a custom fused silica glass-spaced etalon from CVI. Its front and back reflectivities were 97% and 99.3%, respectively, for 1064 nm. This PFT etalon 415 was square with an aperture size of 30 by 25 mm and the two gaps 503 on the front surface 506 (FIG. 5) were 5 by 25 mm. The PFT etalon's thickness was 10 mm, and it had a free spectral range of 38 pm (40 GHz). A very narrow line (of about femtometer linewidth) cw laser was used to measure its linewidth and found it to be about 0.9 pm or 954 MHz. As a result, it had a finesse of 42. From light-travel time considerations, this results in delay range of 8.4 ns between the two oppositely tilted pulses.

Rather than the anamorphic lens 430 shown in FIG. 4(b), two cylindrical lenses having focal lengths of 200 mm and 100 mm were used before the SHG crystal 433 (FIG. 4). This combination is optically equivalent to an anamorphic lens. Other appropriate optical devices may be used to direct the beams onto the SHG crystal 433.

For the nonlinear SHG crystal 433, a 1 cm-thick $LiIO_3$ crystal was used with an aperture size of 2 cm by 5 mm, cut to phase-match SHG at 1064 nm for collinear beams. The full crossing angle of the two tilted pulses at the SHG crystal 433 was approximately equal to the input angle of the beams into the PFT etalon 415, or about 2°.

For spectrally resolving the 532 nm SH light 436 (FIG. 4), a custom fused silica glass-spaced etalon 439 (FIG. 4) from CVI was used with a front surface reflectivity of 97% and a back surface reflectivity of 99.3%. The etalon 439 was round with a 1 inch diameter and a width of 10 mm, corresponding to a free spectral range of 10 pm or 10.6 GHz. The transparent gap at the bottom of the front surface was 3 mm wide at its center, and the etalon was tilted with respect to the incoming beam by 0.9°. The linewidth of this etalon 439 was experimentally found to be 0.13 pm (138 MHz), which we measured by measuring the spectral fringe contrast versus delay for a double pulse from a Michelson interferometer. The Michelson interferometer was used to calibrate the FROG's frequency axis because the path-length difference could easily be measured, from which the spectral fringe spacing could be calculated.

The lens 445 (FIG. 4) for mapping wavelength onto position had a focal length of 50 cm.

Figure 10:
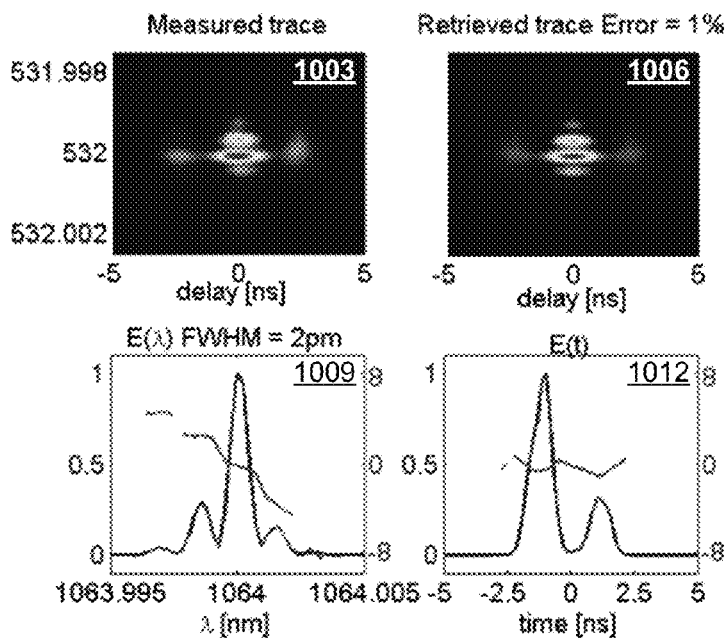
FIGS. 10-13B illustrate examples of various ns pulse measurements taken with the single shot measurement systems of FIGS. 7-9 in accordance with various embodiments of the present disclosure.

As a first test, a double pulse was measured, which makes for an excellent test pulse because it has a very distinct and characteristic FROG trace, and it can also be used to calibrate the delay and frequency axes, given the path length difference in the Michelson interferometer (which can be measured in this case simply using a ruler). The input pulse 403 (FIG. 4) was generated by propagating the microdisk seed laser through an unbalanced Michelson interferometer, yielding two pulses with a 2.6 ns pulse separation between them and whose relative intensity was 36%. This pulse provided an excellent test for another reason: it is quite complicated, having a FROG-trace spectral fringe spacing of 0.36 pm and a time bandwidth product of about 15. The measured FROG trace 803 for this double pulse is shown in FIG. 10.

To extract the pulse's field E(t) from the FROG trace 1003, a phase retrieval application for femtosecond FROG traces described above. FROG operates simultaneously in both domains and therefore massively over-determines the pulse (there are $N^2$ points in its N×N data array, which determine the significantly less N intensity points and N phase points). The retrieved FROG trace 1006 for the double pulse is shown in FIG. 10. The bottom images 1009 and 1012 show the reconstructed temporal intensity and phase. The measurement nicely illustrates the about 8 ns of delay range, and sub-picometer spectral resolution of the FROG.

Figure 11:
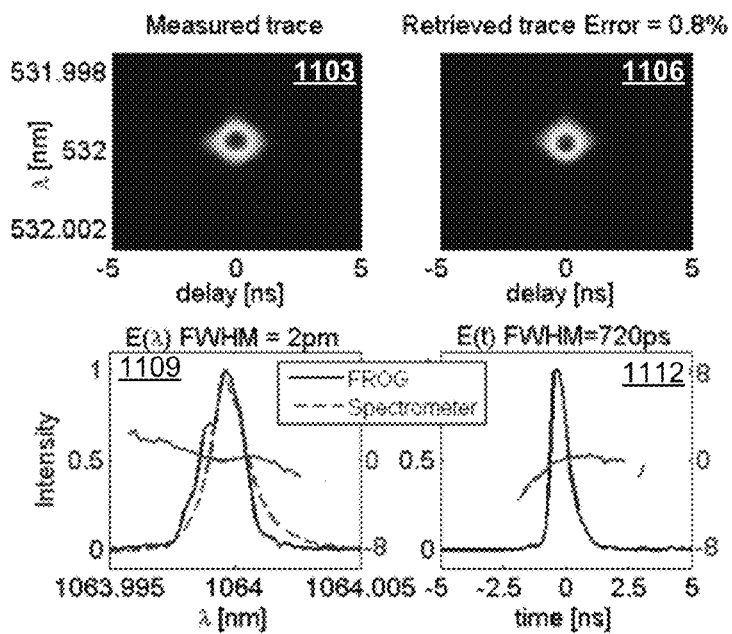

The direct output of the microdisk seed laser was obtained, yielding a slightly chirped 720 ps pulse with a bandwidth of about 2 pm. FIG. 11 shows the measured FROG trace 1103 and retrieved trace 1106. The reconstructed temporal intensity and phase are shown as solid lines in images 1109 and 1112. To confirm the result, an independent measurement of the laser's spectrum was made using an etalon spectrometer for 1064 nm (with 0.9 pm resolution) and plotted as the dashed line in image 1109. The two spectra are in good agreement.

Figure 12:
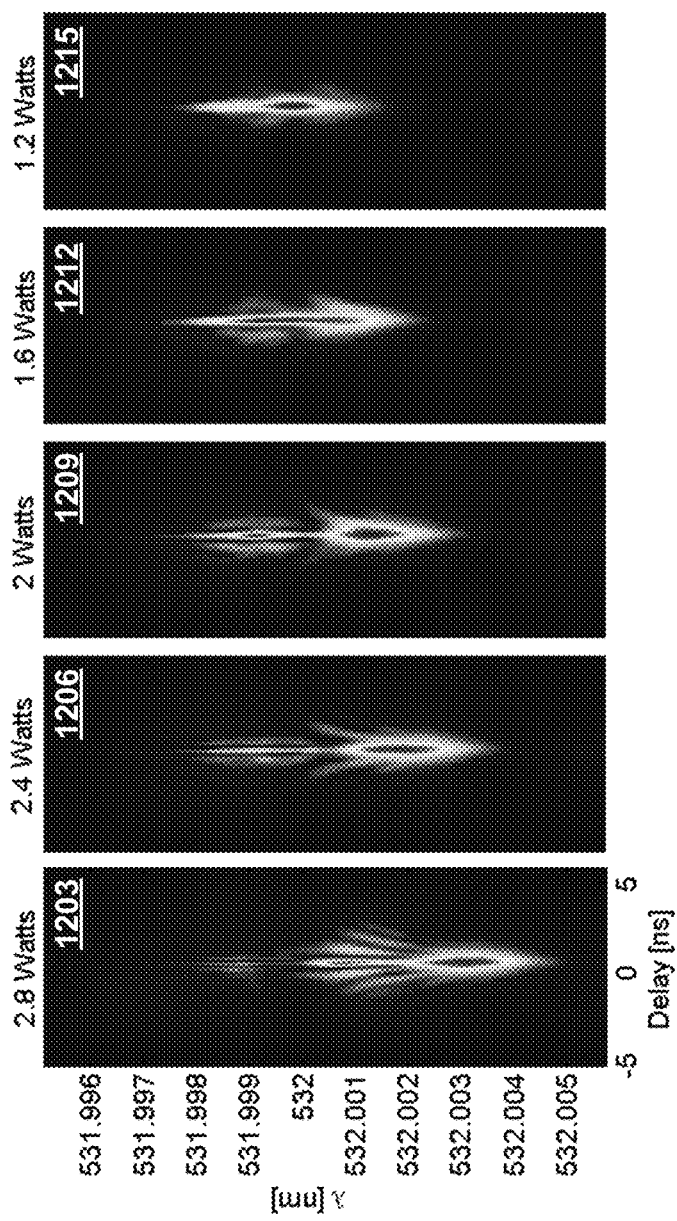

The single shot measurement system 400 of FIG. 4 is a powerful tool for examining both the time-domain and frequency-domain structure of the pulse change in real time, which can be particularly important in amplified pulses. Referring to FIG. 12, shown are FROG traces of pulses from the Yb fiber amplifier for different pump power levels. Due to stimulated Brillion scattering and self-phase modulation, the spectrum broadens and red-shifts as the amplified seed pulse gains more energy. Power levels of 2.8 Watts, 2.4 Watts, 2 Watts, 1.6 Watts, and 1.2 Watts correspond to images 1203, 1206, 1209, 1212, and 1215, respectively.

Figure 13A:
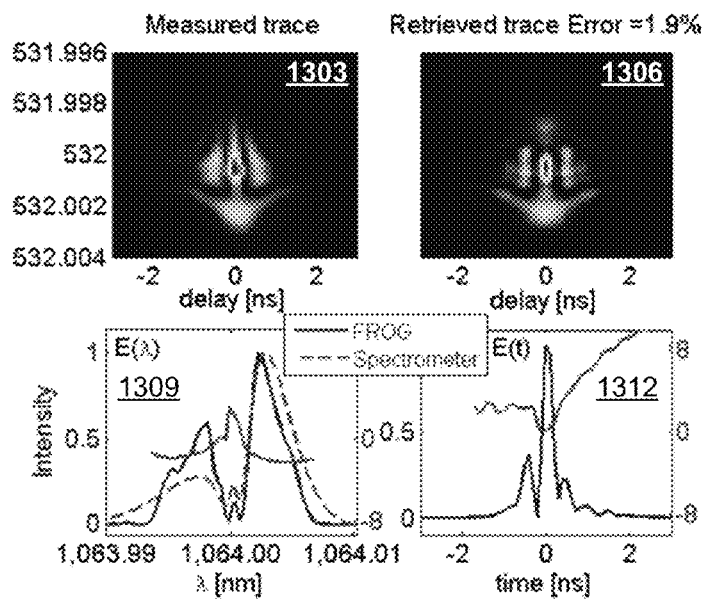
Figure 13B:
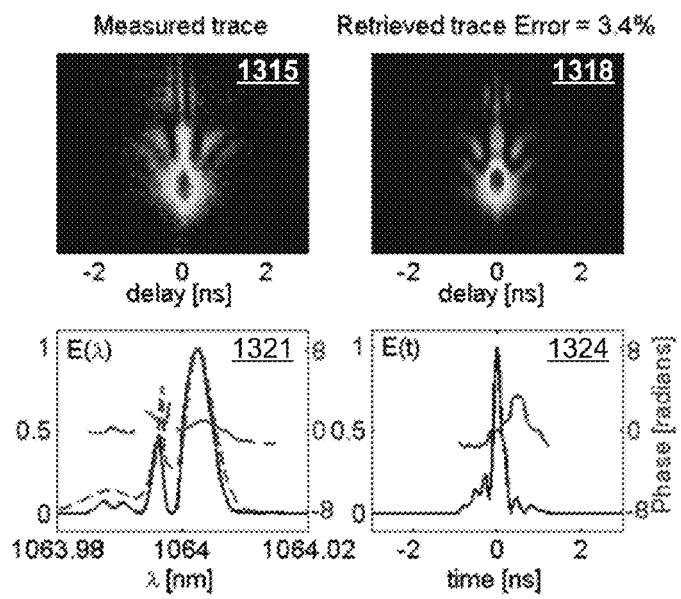

Retrieved amplified pulses are shown in FIGS. 13A and 13B for pump power levels of 2 Watts and 2.8 Watts. FIG. 13A shows the measured FROG trace 1303 associated with the trace 1209 of FIG. 12 and the corresponding retrieved trace 1306. The reconstructed temporal intensity and phase are shown as solid lines in images 1309 and 1312. Due to the low power of these pulses, the FROG traces 1303 were averaged over about 100 pulses. Likewise, FIG. 13B shows the measured FROG trace 1315 associated with the trace 1203 of FIG. 12 and the corresponding retrieved trace 1318. The reconstructed temporal intensity and phase are shown as solid lines in images 1321 and 1324. With the higher amplification level, single-pulse measurement is shown in FROG trace 1315. Independent etalon spectrometer measurements are shown with dashed lines for comparison in images 1309 and 1321.

The small discrepancies in the two spectra in FIGS. 13A and 13B may be the result of better spectral resolution of the FROG than the spectrometer. The FROG retrieval algorithm, coupled with FROG's redundant information, usually improves the resolution. This is nicely illustrated by the measurements in images 1309 and 1321, in which the FROG algorithm was able to recover spectral features even smaller than the spectral resolution of its own spectrometer. This is because a small spectral feature in the pulse is also present in the trace as a large temporal feature, which is generally easier to measure. And because the FROG retrieval algorithm is constrained to satisfy the time-bandwidth uncertainty principle, the fine spectral feature is recovered in the reconstructed pulse.

With more amplification, single-pulse measurements at 2.8 Watts confirmed that the amplified pulse's temporal intensity and phase were not varying from shot-to-shot. The energy in a single pulse was still only slightly above the system detection level, so the higher error is due to the noise in the trace after standard noise filtering. The measurements of FIGS. 10-13 demonstrate the ability of the single-shot measurement system 400 to measure even complex pulses in the 175 ps to 3 ns range, using a very simple, all-optical device.

The measurement range was also limited somewhat by the need to image through the spectrometer's etalon 439 (FIG. 4). Because there is a large optical path-length difference between the light that exits the etalon 439 on the first and last bounces, a large depth of field, equal to this distance, is required. Given the required depth of field of about 1.5 m (i.e., the pulse front tilt), it was possible to solve for the smallest resolvable feature of about 350 μm. The SHG crystal 433 (FIG. 4) had a width of 2 mm along the delay axis. So by choosing the correct imaging lenses, about 30 temporal features can fit across the SHG crystal 433 and be accurately imaged through the 532 nm etalon 439. Therefore, the maximum measurable time-bandwidth products (TBP) of the device was about 30, but could be larger if a wider SHG crystal 433 is used. The next limitation in measurable pulse complexity is given by the finesse of the 532 nm spectrometer etalon, which was about 90 for the setup. The FROG could also measure broader- or narrower-bandwidth pulses by using narrower or thicker etalons 439.

The single-shot nanosecond laser pulse measurement works for a large range of center wavelengths. A different center wavelength simply changes the output angle of the tilted pulse from the PFT etalon 415 (FIG. 4), much like the diffracted angle from a grating would change. But because the PFT etalon 415 is imaged onto the SH crystal 433, angle changes will not affect the alignment of the FROG, although the slit may need adjusting. Changes in the input pulse center wavelength should simply move the FROG trace up and down along the wavelength axis and may require tilting the SH crystal 433 to maintain the phase matching angle.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, wavelengths, focal lengths, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a wavelength range of "about 0.1% to about 5%" should be interpreted to include not only the explicitly recited wavelength of about 0.1% to about 5%, but also include individual wavelengths (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising the steps of:
   directing a laser pulse into a pulse-front tilt (PFT) etalon at an input angle with respect to a surface normal of the PFT etalon that is greater than zero degrees and less than or equal to two degrees; and
   propagating the laser pulse through the PFT etalon to form a linearly tilted pulse having a massive PFT with respect to a direction of propagation of the linearly tilted pulse, the massive PFT dependent upon the input angle and a thickness of the PFT etalon.

2. The method of claim 1, further comprising the step of removing etalon higher order components of an etalon output beam comprising the linearly tilted pulse.

3. The method of claim 1, wherein the PFT etalon is a virtually imaged phased array (VIPA) etalon.

4. The method of claim 1, wherein the PFT of the linearly tilted pulse is greater than 60°.

5. The method of claim 4, wherein the PFT of the linearly tilted pulse is greater than 75°.

6. The method of claim 1, wherein the PFT of the linearly tilted pulse is about 89.9°.

7. The method of claim 1, further comprising the step of propagating the linearly tilted pulse through an optical device to maintain temporal intensity and phase of the linearly tilted pulse at an image plane.

8. The method of claim 1, further comprising the step of forming a pair of linearly tilted pulses that are tilted in opposite directions.

9. The method of claim 8, further comprising the step of propagating the pair of linearly tilted pulses along a pair of crossing trajectories through a second harmonic generation (SHG) crystal to yield a single-shot autocorrelation.

10. A method, comprising the steps of:
    generating a pair of pulses that are tilted in opposite directions from an input pulse;
    directing the pair of pulses into a pulse front tilt (PFT) etalon; and
    propagating the pair of pulses through the PFT etalon in opposite directions to form a pair of massively tilted pulses that are tilted in opposite directions and at an angle between the pair of massively tilted pulses of less than 180 degrees.

11. The method of claim 10, further comprising the step of propagating the pair of massively tilted pulses along a pair of crossing trajectories through a second harmonic generation (SHG) crystal to yield a single-shot autocorrelation.

12. The method of claim 11, wherein the SHG crystal is in an image plane.

13. The method of claim 11, further comprising the step of removing higher harmonics components of the pair of massively tilted pulses before propagating along the pair of crossing trajectories.

14. The method of claim 11, further comprising the step of propagating the single-shot autocorrelation through a spectrometer etalon to form a two-dimensional trace.

15. The method of claim 14, further comprising the step of capturing an image of the two-dimensional trace with an image capture device.

16. The method of claim 15, further comprising focusing the two-dimensional trace on the image capture device for capture.

17. The method of claim 10, wherein the PFT etalon is a virtually imaged phased array (VIPA) etalon.

18. The method of claim 10, wherein the pair of pulses are generated with a Fresnel biprism.

19. The method of claim 10, wherein each pulse of the pair of pulses enters the PFT etalon through a different opening located on opposite sides of an input surface of the PFT etalon.

20. The method of claim 10, wherein the pair of pulses enters the PFT etalon through an opening located in an input surface of the PFT etalon.

21. A system, comprising:
a Fresnel biprism configured to produce a pair of pulses from an input pulse;
a pulse front tilt (PFT) etalon; and
a lens positioned between the Fresnel biprism and the PFT etalon to direct each pulse of the pair of pulses through an opening in an input surface of the PFT etalon, where the PFT etalon is configured to yield a pair of tilted pulses that are tilted in opposite directions and at an angle between the pair of tilted pulses of less than 180 degrees, each pulse of the pair of tilted pulses having a massive pulse front tilt with respect to a direction of propagation of that pulse.

22. The system of claim 21, wherein the PFT etalon includes openings located on opposite sides of the input surface, each pulse of the pair of pulses directed through a different one of the openings.

23. The system of claim 21, wherein the PFT etalon includes one opening located in the input surface, the pair of pulses directed through the one opening.

24. The system of claim 21, further comprising a lens configured to focus the pair of tilted pulses through a slit to remove higher orders.

25. The system of claim 21, wherein the PFT etalon is a virtually imaged phased array (VIPA) etalon.

26. The system of claim 21, further comprising:
a second harmonic generation (SHG) crystal; and
a lens configured to direct the pair of tilted pulses along a pair of crossing trajectories through the SHG crystal to yield a single-shot autocorrelation.

27. The system of claim 26, further comprising a blue filter positioned after the SHG crystal to filter the single-shot autocorrelation.

28. The system of claim 26, further comprising an imaging spectrometer configured to capture a single shot trace generated from the single shot autocorrelation.

29. The system of claim 28, wherein the imaging spectrometer includes a spectrometer etalon and an image capture device.

30. The system of claim 29, wherein the spectrometer etalon is a virtually imaged phased array (VIPA) etalon.

* * * * *